(No Model.)
G. DE LAVAL.
DEVICE FOR LUBRICATING BEARINGS.
No. 311,966. Patented Feb. 10, 1885.
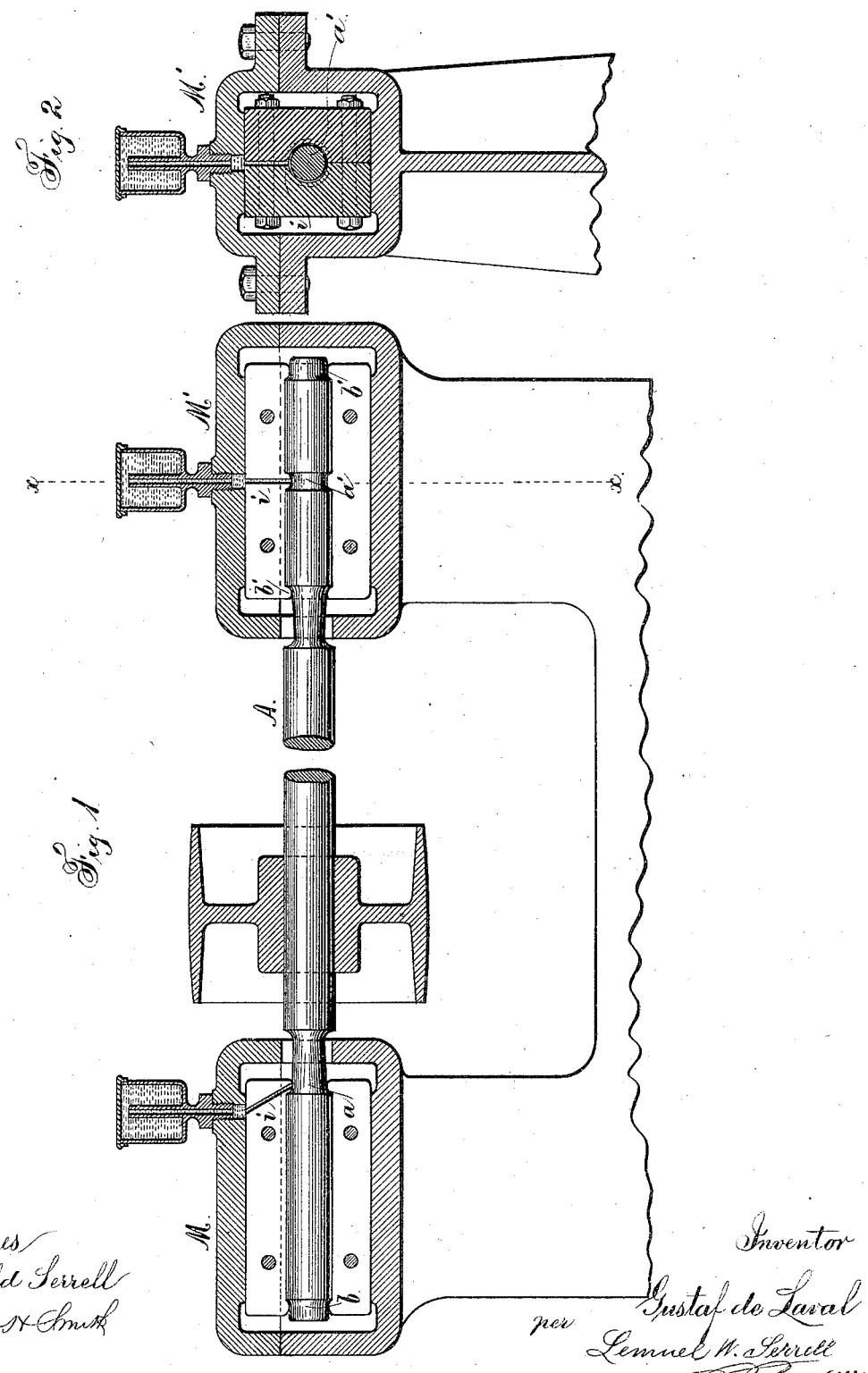
Witnesses
Harold Serrell
Chas H. Smith
Inventor
Gustaf de Laval
per Lemuel W. Serrell
atty

UNITED STATES PATENT OFFICE.

GUSTAF DE LAVAL, OF STOCKHOLM, SWEDEN.

DEVICE FOR LUBRICATING BEARINGS.

SPECIFICATION forming part of Letters Patent No. 311,966, dated February 10, 1885.

Application filed June 27, 1884. (No model.) Patented in England March 28, 1884, No. 5,619.

*To all whom it may concern:*

Be it known that I, GUSTAF DE LAVAL, of Stockholm, in the Kingdom of Sweden, have invented a new and useful Improvement in Lubricating Bearings, of which the following is a specification.

This invention relates to a new means of lubrication of shafts and axles revolving with very high velocity, and has for its object to allow such velocity to be raised considerably above that hitherto attainable.

The difficulty, well known to practical engineers, of securing a satisfactory lubrication of shafts or axles revolving with a very high rate of speed results from the centrifugal power acting at the circumference of such shafts or axles, so that the lubricating matter is thrown back, and consequently prevented from reaching all the supporting parts of the bearing. According to the present invention this centrifugal power of the revolving shaft or axle is applied to suck in the lubricating matter into the supporting part or parts of the bearing, and the higher such rate rises the more energetic is the sucking action, and the more lubricating matter is passed upon the journal and the supporting part of the bearing. It can be observed that oil or other fatty liquid brought in contact with a conical-shaped or tapering shaft revolving with sufficient speed tends to rise along the shaft from that part having a smaller diameter up to that part of larger diameter. This tendency arises from the centrifugal power, which is greater at the circumference of the larger part of the shaft than at that part of smaller diameter. The oil or fatty matter is sucked upward and passes along the shaft from its thinner part to that part of greater diameter. The construction of the new bearing is such that the oil or lubricating-liquid generally is fed to one or more parts of the shaft or axle of a smaller diameter than that part or those parts supported by the bearing, and also than that part of the shaft at which the waste lubricating matter is intended to be removed from the supporting-bearing. The oil is during the revolution of the shaft or axle sucked into the supporting part or parts of the bearing, and forced or thrown out at the opposite end.

This invention is illustrated by the accompanying drawings, in which Figure 1 is a vertical longitudinal section of my lubricator; and Fig. 2 is a cross-section at the line $x\ x$, Fig. 1.

A designates a shaft constructed to revolve at a high rate of speed.

M and M' designate supporting bearings or boxes, the general construction of which can be modified or altered according to circumstances, or as convenient for each case. With the bearing M the lubricating-liquid is at $i$ fed to the diminished part $a$ of the shaft A. The diameter of the shaft rises successively to that part supported by the bearing, and while revolving at sufficient speed the liquid is sucked into the bearing, and passes through the same and out at the end $b$ of the shaft, which part is of larger diameter than part $a$.

The bearing M' shows a modification in which the lubricating-liquid is fed to the shaft A, not at one end, as before described, but at the center part of the bearing at $i$. At this part $a'$ the shaft is of smaller diameter than at the adjacent parts, and likewise smaller than at the ends of the bearings. The action is such that while the shaft is revolving at sufficient speed the lubricating-liquid supplied at $a$ is sucked up along the larger parts of the shaft, and passes along to the ends of the bearings, where the shaft is reduced, as at $b'\ b'$.

I claim as my invention—

1. The method herein specified of lubricating shafts or axles revolving at a high rate of speed by the centrifugal action of the revolving shaft, consisting in supplying the lubricating-liquid to a part or parts of the shaft having a smaller diameter than that part or those parts that are supported by the bearing, substantially as specified.

2. A journal or shaft to be revolved at a high rate of speed, having a diminished portion or neck adjacent to an enlarged portion or journal, in combination with a bearing surrounding such journal, and an oil-supply cup and tube passing to the said diminished portion or neck, substantially as set forth.

3. The journal or shaft to be revolved at a high rate of speed, having a diminished portion or neck between the two larger portions, in combination with the bearing surrounding such larger portions, and the oil-supply tube opening at such neck, substantially as described, and as illustrated in the accompanying sheet of drawings.

GUSTAF DE LAVAL.

Witnesses:
F. ENGEL,
F. CLAIRMONT.